No. 709,149. Patented Sept. 16, 1902.
A. H. GRANDJEAN & E. J. BOUVIER.
DRIVING CHAIN.
(Application filed Dec. 16, 1901.)
(No Model.)
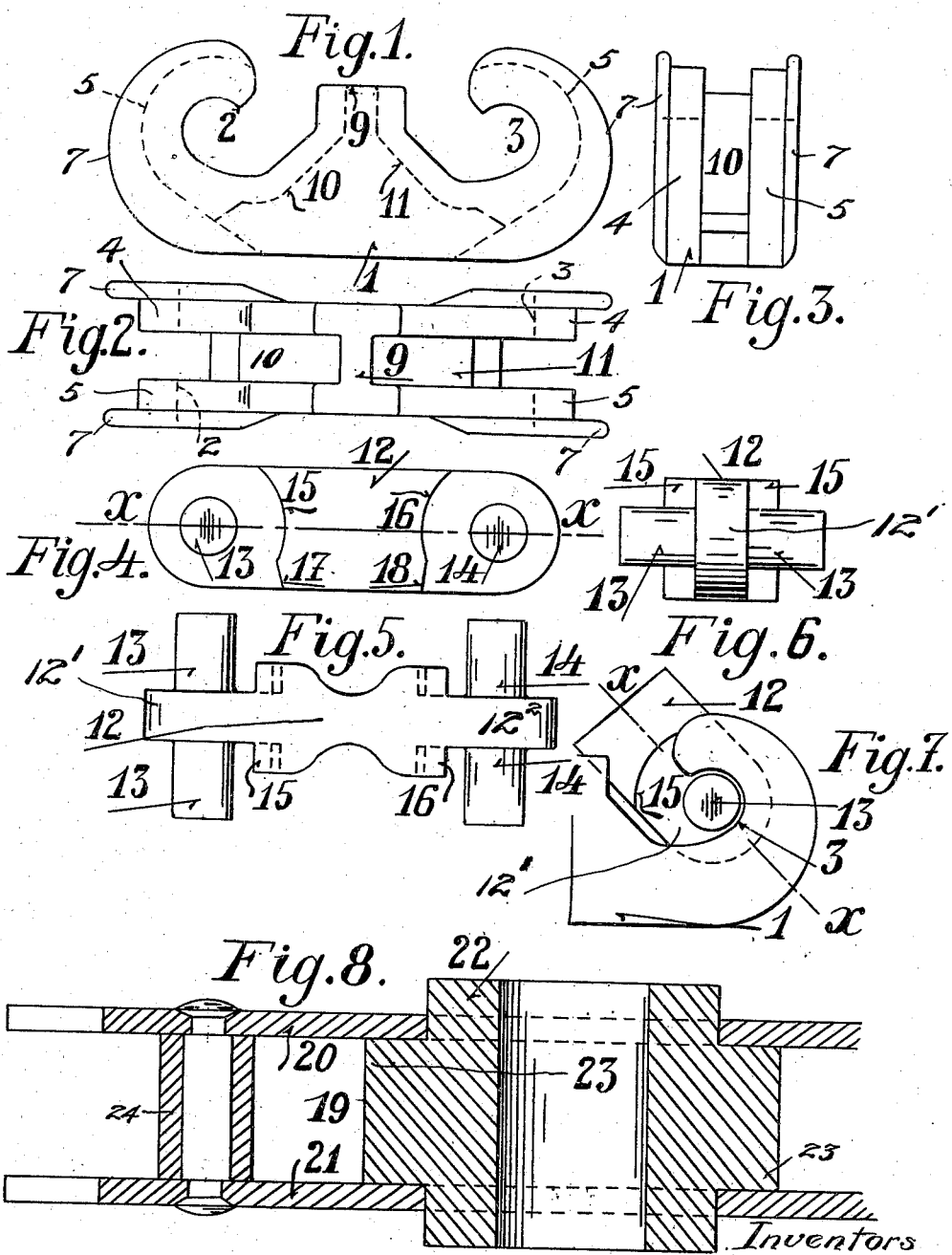
Inventors
A. H. Grandjean
E. J. Bouvier

UNITED STATES PATENT OFFICE.

ADOLPHE HENRI GRANDJEAN AND EMMANUEL JEAN BOUVIER, OF PARIS, FRANCE.

DRIVING-CHAIN.

SPECIFICATION forming part of Letters Patent No. 709,149, dated September 16, 1902.

Application filed December 16, 1901. Serial No. 86,100. (No model.)

*To all whom it may concern:*

Be it known that we, ADOLPHE HENRI GRANDJEAN, civil engineer, and EMMANUEL JEAN BOUVIER, citizens of the Republic of France, residing at Paris, France, have invented new and useful Improvements in Driving-Chains, of which the following is a specification.

This invention relates to a male link and a female link forming a detachable chain, which is more particularly characterized by the fact that the female link has two identically-similar recesses so adapted as not to allow of the entrance of the ends of the male link formed with two cams except at an internal angle of forty-five degrees and then to allow the said ends of the male link to extend in the opposite direction from the initial angle of forty-five internal degrees as far as the vertical through forty-five degrees below the horizontal, with the object of rendering it impossible for the links to become detached from each other except by moving the male link back to the angle at which it was inserted.

In the accompanying drawings, Figure 1 is an elevation of the female link. Fig. 2 is a plan thereof. Fig. 3 is an external end view of the female link. Fig. 4 is an elevation of the male link, and Fig. 5 is a plan thereof. In Fig. 6 we show an external view of the transverse pins situated at one of the ends of the male link. Fig. 7 is a view showing the insertion of the pin into its recess. Fig. 8 is a plan in section of a pulley, over which can pass a chain composed of the links shown in the preceding figures.

The female link or coupler comprises a body 1, having hooked ends in which are formed the similar transverse recesses 2 and 3, which receive the pins or lugs on the male link. Each hooked end is bifurcated to form a longitudinal slot, which separates the sides or arms 4 and 5 of the hook and which receives the end of the male link. These longitudinal slots extend into the body portion 1 and terminate in the inclined walls 10 and 11 in the central rib or web 9, which separates the hooked ends of the coupler. The outer face of each of the arms of each hook is extended to form a guide-flange 7, and between these flanges the body portion of the male link is held.

The male link consists of the central body portion 12, having reduced ends $12'$ and $12^2$, on which are cast the transverse pins or lugs 13 and 14, which bear in the transverse recesses 2 and 3, formed in the female link or coupler.

15 and 16 denote curved shoulders, which are formed on the body portion of the male link by reducing the ends $12'$ and $12^2$ thereof and which correspond in shape to the curve of the outer ends of the arms 4 and 5 of the hooked ends of the female link. Portions of these shoulders are cut away, as shown at 17 and 18, to allow the chain to work on wheels of very small diameter.

It is possible to cast in one piece with the male link any suitable fastenings for any objects in view. The insertion of the pin 13 into the recess 3, for example, is effected by placing the horizontal axis $x\ x$ of the pin 13, Fig. 4, at an internal angle of forty-five degrees, Fig. 7, and in then allowing the horizontal axis X X of the male link to move in the opposite direction from the initial internal angle of forty-five degrees as far as the vertical through forty-five degrees below the horizontal. Then by so connecting together the female links and the male links in succession and in a suitable number a chain will be formed. The wheel 19, Fig. 8, is composed of two circular cheeks 20 21, of metal, formed with recesses for the reception of the pins of the male link. These cheeks are fixed on a central hub 22, formed with shoulders that determine the distance between the cheeks. The bore and diameter of said shoulders 23 are variable. In order to maintain a clear passage-way for the links, the distance between the cheeks near the recesses is maintained by a stay-piece 24 of any kind which will allow of bolting or riveting together.

Having thus described our invention, what we claim as new, and desire to secure by Letters Patent, is—

1. In a detachable chain, a female link comprising a body portion 1, bifurcated hooked ends 4 and 5 forming transverse recesses 2 and 3, inclined walls 10 and 11 formed in the body portion 1, and guide-flanges 7 formed on the outer faces of the hooks, in combination with a male link comprising a body portion 12, reduced ends 12' and 12² adapted to operate between the bifurcated hooked ends 4 and 5 of the female link, pins 13 and 14 formed on said reduced ends and adapted to operate in the transverse recesses 2 and 3 of the female link, and curved shoulders 15 and 16 adapted to coact with the outer ends of the hooks 4 and 5 and to be guided by the flanges 7.

2. In a detachable chain, a female link comprising a body portion 1, bifurcated hooks 4 and 5 on each end thereof, forming between them slots, the inner ends of which are closed by the inclined walls 10 and 11 and said hooked ends forming recesses 2 and 3, in combination with a male link comprising a body portion 12, reduced ends 12' and 12² to operate between the hooks 4 and 5, pins 13 and 14 formed on the said reduced ends and adapted to operate in the recesses 2 and 3 of the female link, shoulders 15 and 16 to coact with the outer ends of the hooks 4 and 5, and the portions 17 and 18 of the said shoulders cut away to prevent contact of the said shoulders with the inclined walls 10 and 11 when the chain is used on wheels of relatively small diameter.

3. In a detachable chain, a female link comprising a body portion 1 provided with bifurcated hooked ends, said bifurcations forming slots, inclined walls 10 and 11 closing the inner ends of the said slots, and recesses 2 and 3 formed by the hooked ends, in combination with a male link comprising a body portion 12, reduced ends 12' and 12² adapted to operate between the bifurcated hooked ends of the female link, pins 13 and 14 formed on the said reduced ends and adapted to operate in the recesses 2 and 3, and shoulders 15 and 16 arranged at each side of the male link, the said shoulders having curvatures corresponding to those of the hooks of the female link for the purpose of preventing the insertion or removal of the pins 13 and 14 into and from the recesses 2 and 3 except at an angle abnormal to the working angle of the links.

In testimony whereof we affix our signatures in presence of two witnesses.

ADOLPHE HENRI GRANDJEAN.
EMMANUEL JEAN BOUVIER.

Witnesses:
LOUIS BAUDART,
ANTOINE AUGIER.